Figure 1:
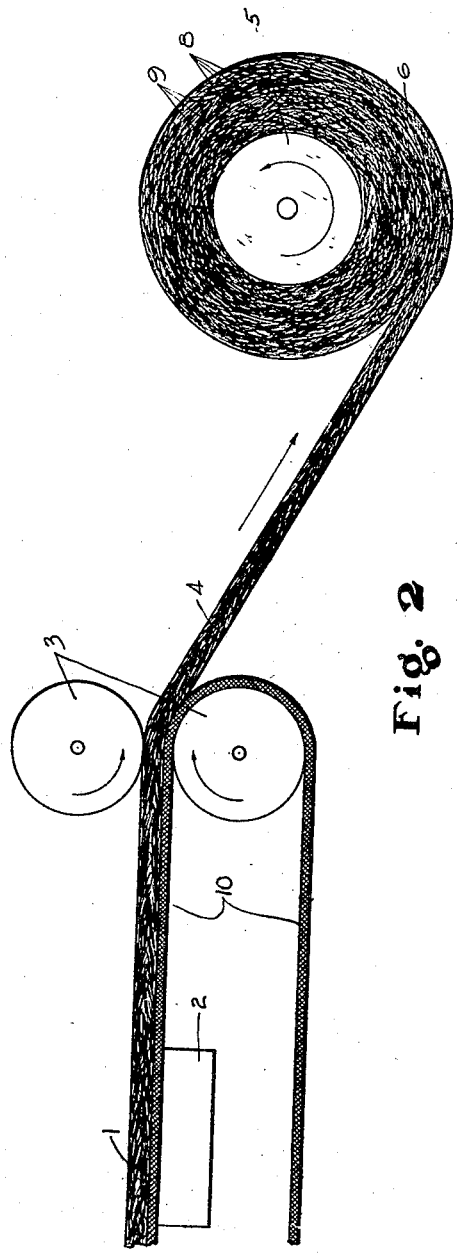

R. P. PERRY.
LAMINATED CONDUIT AND PROCESS OF MAKING THE SAME.
APPLICATION FILED OCT. 4, 1917.

1,316,591.
Patented Sept. 23, 1919.

INVENTOR
Ray P. Perry
BY
Edward M. Evarts
ATTORNEY

UNITED STATES PATENT OFFICE.

RAY P. PERRY, OF UPPER MONTCLAIR, NEW JERSEY, ASSIGNOR TO THE BARRETT COMPANY, A CORPORATION OF NEW JERSEY.

LAMINATED CONDUIT AND PROCESS OF MAKING THE SAME.

1,316,591.  Specification of Letters Patent.  Patented Sept. 23, 1919.

Application filed October 4, 1917. Serial No. 194,775.

*To all whom it may concern:*

Be it known that I, RAY P. PERRY, a citizen of the United States, residing at Upper Montclair, in the county of Essex and State of New Jersey, have invented certain new and useful Improvements in Laminated Conduits and Processes of Making the Same, of which the following is a specification.

My invention relates to articles, such as conduits, for example, which are built up in laminated form out of successive, contacting layers of paper or felt material in sheet form, especially of the material described and claimed in my co-pending application bearing Serial No. 161,670, filed April 12, 1917.

This material consists essentially of a mixture of disintegrated paper-making stock in the form of a watery pulp, and comminuted waterproofing material, such as coal tar pitch or petroleum pitch, asphalt, etc., especially in the form of threads or filaments. The waterproofing material is usually added to the paper-making material while the latter is in the beater. The beaten mixture is then formed into a layer in the usual manner, on any desired type of paper or felt-making machine.

Hitherto it has been customary to make such articles as paper conduits, for example, by winding a previously formed sheet of paper or felt after such sheet has left the couche roll and has passed the usual suction box and press rolls, where a part, but not all, of the water in the pulp has been extracted, about a core of cylindrical or other desired form. After the desired number of layers of the wet sheet have been wound about the core the sheet is severed and the core is removed. The wet tube or cylinder of laminated paper or felt is then dried by any suitable means and the dried tube or cylinder is usually impregnated by dipping in a waterproofing compound, generally of a bituminous nature, to make them suitable to stand exposure to the elements, and the conduit is complete when the surplus impregnating waterproofing material has been drained off and the conduit has become sufficiently hardened.

The disadvantage of this mode of procedure is that before waterproofing the paper conduits to make them suitable to stand exposure to the elements it is necessary to dry them, which step is necessarily slow, difficult and expensive of accomplishment, and it is then difficult to get the conduits thoroughly impregnated with the waterproofing material as the walls of the dried conduits are fairly thick (sometimes about one-quarter inch) and quite dense and relatively impermeable to the waterproofing compound even when the same is in a heated liquid condition.

As a result of the method and construction of my invention, these disadvantages are largely avoided and a conduit of superior mechanical strength and waterproofed qualities is produced. Instead of making my conduit of the ordinary paper stock with the resulting disadvantages referred to in the preceding paragraph, I build my conduit of the material described and claimed in my co-pending application referred to above, which is in sheet form and contains already incorporated therein as much as 50% or more of its water-free weight of bituminous material in comminuted form, preferably in the form of threads or filaments. The laminated structure as a conduit, for example, is built up of successive contacting layers or sheets of this material, as by winding the same about a core of cylindrical or other desired form. Preferably the winding takes place after the sheet has left the suction box and press rolls of the usual paper-making machine, when the sheet will have a part but not all of the water content of the same removed but will still be moist while possessing the necessary mechanical strength required to permit of its subsequent manipulation without danger of breaking. For a reason subsequently to be set forth, the sheet in my process may have a greater percentage of water removed therefrom and be therefore rendered mechanically stronger than would be feasible in the process as hitherto practised.

After a sufficient number of successive contacting layers have been built up on the core or other forming means, the sheet is severed, the core or other forming means removed and the conduit or other laminated article dried, preferably by the application of heat in any desired or suitable manner. As a result of the presence of the bituminous or other fusible waterproofing material in comminuted form, which material is readily softened by heat and becomes adherent, the softening or fusing action of the heat upon the bituminous or equivalent material present at the points of contact of the contacting layers, causes the successive layers to a certain extent to become "autogenously" cemented together at the adjoining surfaces, with the formation of a union that is much superior mechanically to the joint produced in the ordinary mode of procedure. Due also to the fact that a very appreciable proportion of the layers is made up of non-water absorbing or water-repellent waterproofing material, the layers do not carry so much water which must be dried out before impregnating in the usual waterproofing bath. Also, a large amount of finely divided waterproofing material is already distributed throughout the conduit in a fairly uniform manner, and it is not necessary to supply so much waterproofing material by the later impregnating process, as obviously the conduit contains a smaller amount of paper or other fibrous material which needs waterproof to make it suitable to withstand the elements.

After the tube or other laminated article has been dried, as by the application of heat, with the result that the adjoining surfaces are, to a certain extent, united due to the aforesaid "autogenous" cementing action, the article may be waterproofed by immersing the same in a bath of waterproofing material, such as the bituminous material used in the manufacture of the layers, for example. The impregnated article is then drained and permitted to become dry, when it is completed. The initial presence in the layers of a substantial amount of waterproofing material, such as bituminous material, amounting, if desired, to as much as 50% or more of the water-free weight of the material of which the sheets or layers are made, renders the impregnation easier and more uniform and makes it possible for the article to acquire its predetermined content of waterproofing material in a more uniform manner and in a shorter period of time than by the method hitherto employed.

Figure 2:
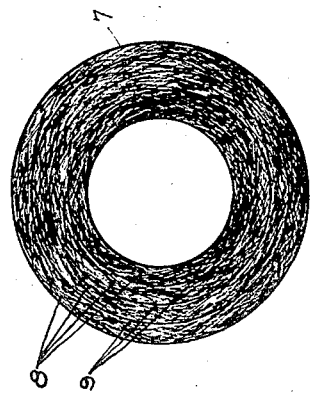

Referring to the drawing wherein I have illustrated my invention,

Figure 1 is a diagrammatic view showing the manipulation of the sheet in the manufacture of the laminated article, and Fig. 2 is an end view of one form of article made by my invention.

1 indicates the layer of fibrous material in the form of a watery pulp lying on the so-called "wet felt" 10 of the paper-making machine and containing incorporated therein a substantial amount of comminuted waterproofing material, preferably in filamentary form, all as described in my co-pending application referred to above. This layer 1 is shown as it approaches the suction box 2 and the pressure rolls 3 where enough of the water content of the pulp is removed to render the layer sufficiently strong to support itself. This layer 4 is then led to the core 5 of cylindrical or other desired form which is rotated in the direction shown by the arrow and upon which the sheet 4 is wound until the predetermined number of layers 8 have been formed upon the core 5. The sheet 4 is then severed at any desired point as at 6, the core is then removed and the hollow body 7, made up of the layers 8, having the contacting surfaces 9, is dried in any suitable manner as by the application of heat. The drying action, in the case of the article of my invention, has the above-described beneficial results. After the article 7 has been properly dried thereby causing the layers 8 to be to a certain extent "autogenously" cemented together at their contacting surfaces 9 as a result of the cementing action of the bituminous or other waterproofing material initially present in the layers 8, the article may, if desired, be impregnated with a waterproofing material by immersing the same in such material. Preferably the waterproofing material consists of a bituminous substance rendered molten if necessary by the application of heat.

What I claim is:

1. An article made up of a plurality of contacting layers of fibrous material containing incorporated therein a substantial amount of comminuted fusible waterproofing material.

2. A conduit made up of a plurality of contacting layers of fibrous material containing incorporated therein a substantial amount of comminuted bituminous material.

3. An article made up of a plurality of contacting layers of fibrous material containing incorporated therein a substantial amount of bituminous material in filamentary form.

4. A conduit made up of a plurality of contacting layers of fibrous material containing distributed therethrough a substantial amount of comminuted fusible waterproofing material.

5. An article made up of a plurality of contacting layers of fibrous material containing distributed therethrough a substantial amount of comminuted bituminous material.

6. A conduit made up of a plurality of contacting layers of fibrous material containing distributed therethrough a substantial amount of bituminous material in filamentary form.

7. A conduit made up of a plurality of contacting layers of fibrous material containing incorporated therein a substantial amount of comminuted fusible waterproofing material, the said layers being impregnated with a waterproofing substance.

8. An article made up of a plurality of contacting layers of fibrous material containing incorporated therein a substantial amount of comminuted bituminous material, the said layers being impregnated with a bituminous waterproofing substance.

9. A laminated conduit made up of a plurality of contacting layers of fibrous material containing distributed therethrough a substantial amount of bituminous material in filamentary form, the said layers being impregnated with a bituminous waterproofing substance.

10. The process of producing articles of the class described which comprises the steps of forming a wet sheet of paper containing comminuted fusible waterproofing material, winding said sheet upon itself on a mandrel thereby forming a tube made up of a plurality of layers of said paper in contact with each other, and thereafter drying the said tube.

11. The process of producing articles of the class described which comprises the steps of forming a wet sheet of paper containing comminuted bituminous material, winding said sheet upon itself on a mandrel thereby forming a tube made up of a plurality of layers of said paper in contact with each other, and thereafter drying the said tube.

12. The process of producing articles of the class described which consists in placing in successive contact a plurality of moist layers, consisting of fibrous material containing incorporated therein a substantial amount of comminuted fusible waterproofing material, drying said contacting layers to expel substantially all of the moisture contained therein and to cause the said layers to become united together, and finally impregnating the united layers with a waterproofing substance.

13. The process of producing articles of the class described which consists in placing in successive contact a plurality of moist layers consisting of fibrous material containing distributed therethrough a substantial amount of comminuted bituminous material, drying said contacting layers to expel substantially all of the moisture contained therein and to cause the said layers to become united together, and finally impregnating the united layers with a bituminous waterproofing substance.

14. The process of producing a laminated conduit which comprises the steps of first forming a sheet of fibrous watery pulp containing distributed therethrough a substantial amount of comminuted pitch, extracting a substantial amount of the water from the said sheet, subsequently winding said sheet to form a cylinder composed of a plurality of contacting layers, and drying said contacting layers to expel substantially all of the moisture contained therein and to cause the said layers to become united together.

15. The process of producing a laminated conduit which comprises the steps of forming a sheet of fibrous watery pulp containing distributed therethrough a substantial amount of comminuted bituminous material, extracting a substantial amount of the water from the said sheet, forming said sheet into a plurality of contacting layers, drying said contacting layers to expel substantially all of the moisture contained therein and to cause the said layers to become united together, and then impregnating the united layers with a bituminous waterproofing substance.

16. The process of producing a laminated conduit which comprises the steps of forming a sheet of fibrous watery pulp containing distributed therethrough a substantial amount of bituminous material in filamentary form, extracting a substantial amount of the water from the said sheet, forming said sheet into a plurality of contacting layers, drying said contacting layers to expel substantially all of the moisture contained therein and to cause the said layers to become united together, and then impregnating the united layers with a bituminous waterproofing substance.

17. A conduit made up of a plurality of contacting layers of a fibrous material containing incorporated therein a substantial amount of comminuted pitch.

18. A conduit made up of a plurality of contacting layers of paper-making material containing distributed therethrough a substantial amount of comminuted pitch.

In testimony whereof I affix my signature.

RAY P. PERRY.